United States Patent
Niemiec

[11] Patent Number: 5,735,553
[45] Date of Patent: Apr. 7, 1998

[54] FLARED TUBE FITTING FOR CONNECTING FLOW CONDUCTORS

[76] Inventor: Albin J. Niemiec, 79700 Hipp Rd., Romeo, Mich. 48065

[21] Appl. No.: 613,248

[22] Filed: Mar. 8, 1996

[51] Int. Cl.[6] ................................. F16L 33/16
[52] U.S. Cl. ............... 285/101; 285/334.1; 285/334.5
[58] Field of Search .......................... 285/101, 375, 285/334.5, 334.1, 354

[56] References Cited

U.S. PATENT DOCUMENTS

| | | | |
|---|---|---|---|
| 1,366,634 | 1/1921 | Clark | 285/375 |
| 2,310,944 | 2/1943 | Douglass | 285/334.5 |
| 2,420,778 | 5/1947 | Herold | 285/334.5 |
| 2,480,529 | 8/1949 | Wang | 285/375 |
| 2,529,534 | 11/1950 | Beerli | 285/334.5 |
| 2,700,559 | 1/1955 | Jensen | 285/375 |
| 3,273,918 | 9/1966 | Legarrd et al. | 285/334.5 |
| 4,114,930 | 9/1978 | Perkins et al. | 285/334.5 |
| 4,407,482 | 10/1983 | Daghe et al. | 285/334.1 |
| 4,802,696 | 2/1989 | Chohan et al. | 285/375 |
| 5,192,095 | 3/1993 | Behrens | 285/334.1 |

FOREIGN PATENT DOCUMENTS

| | | | |
|---|---|---|---|
| 3345430 | 6/1985 | Germany | 285/334.5 |
| 648788 | 2/1979 | U.S.S.R. | 285/375 |

Primary Examiner—Eric K. Nicholson

[57] ABSTRACT

A flared tube fitting for mechanically connecting fluid transmission lines includes one or more diametrically guided and sealed pistons to engage the flared tube connection. These pistons are axially spring loaded and designed to apply a hydrostatic pressure force upon the engaged tube flare connection independent of the clamping force applied by the axially preloaded threaded engagement of the flared tube fitting to the nut member in which the flared transmission line is supported. In the tube connection with a conventional flare tube fitting, the loss of the clamping force of the preloaded threaded engagement will result in the separation of the flared line from the conically shaped end of the flared type fitting. External leakage will occur. In the tube connection of the present invention, the sealing contact at the flared connection will be maintained by the spring and hydrostatic pressure forces on the engaged piston should the clamping force of the preloaded threaded engagement of the nut member be removed.

20 Claims, 7 Drawing Sheets

3
FLARED TUBE FITTING FOR CONNECTING FLOW CONDUCTORS

DOCUMENT DISCLOSURE

This application contains subject matter which is set forth in the U.S. Patent Disclosure Document No. 376,820, filed 26 May 1995.

FIELD OF INVENTION

The invention relates to power transmission flow conductor fittings and particularly to flared tube fitting for connecting flow conductors. The sealing integrity of the line connections is a major consideration.

BACKGROUND OF THE INVENTION

Most tube and hose connectors feature conically shaped ends for sealing the flared transmission line and a threaded section for engaging the nut member which supports the transmission line and applies the mechanical clamping force upon the flared connection. Operating conditions such as hydraulic pressure surges and cyclic loads tend to separate the flared line from the conically shaped connector fitting and cause external leakage. The sealing integrity of the conventional flared tube fitting is dependent upon the clamping force on the flared/conically shaped joint by the preloaded threaded engagement of the flared tube fitting and the nut member in which the transmission line is supported. The removal of the clamping force will result in the flared line separating from the conical shaped end of the flared tube fitting. External leakage will occur. In most hydraulic circuits there are pressure surges, cyclic loads, straightening behavior of pressurized lines, and thermal dimensional changes of the engaged flared fitting and transmission lines; these operating conditions have the tendency of diminishing the clamping force of the axially preloaded threaded engagement of the flared tube fitting and the nut member.

A common complaint of fluid hydraulic systems is the external leakage which can have an ecological impact upon the environment. In some industrial plants the annual hydraulic leakage exceeds one million gallons. The costs for the fluid replacement and treatment of the leakage prior to disposal are costly. It was observed in one industrial plant that a campaign of tightening the hydraulic fittings reduced the fluid leakage by a significant amount, but after approximately six months of operation the fluid leakage increased to the previous amount.

SUMMARY OF INVENTION

The present invention provides a backup mechanism in the flared tube fitting to maintain a sealed joint at the flared line connection, independent of the clamping force applied by the axially preloaded threaded engagement of the nut member.

The objectives of the invention are to:

A. Provide a flared tube fitting for joining flow transmission lines that are not totally dependent on the clamping force of the axially preloaded threaded engagement of the nut member.

B. Provide a flared tube fitting with improved sealing at the flared line connection, and C. Provide a flared tube fitting with the above listed improvements which is interchangeable with the conventional and standard flared tube fittings.

A flared tube fitting assembly in accordance with the present invention includes the basic flared tube fitting with external threads and with one or more hollowed pistons providing the conically shaped sealing surfaces for engaging the flared flow transmission lines. The flared transmission lines are supported and fastened to the flared fitting assembly with nut members engaging the external threads of the flared type fittings. The aforementioned flared type fitting assemblies include various designs of multiple connections which are typically identified as connectors, unions, elbows, tees and crosses.

The hollowed piston in the flared tube fitting is dimensionally sized to apply a hydrostatic pressure force upon the conically shaped/flared sealing surfaces, independent of the mechanical clamping force applied by the axially preloaded thread engagement of the nut member and the flared tube fitting. The hydrostatic pressure force is proportioned to the pressure of the transmitted flow in the flared tube fitting.

A mechanical spring means is internally located between the piston and the body of the flared tube fitting to prevent the piston conically shaped end from losing contact on the flared surface of the transmission line. Should the threaded nut member lose its clamping force the spring force and the hydrostatic forces on the piston will maintain the sealing contact at the flared line connection. A sealing means is located between the piston and the recess diameter in the body of the flared tube fitting to prevent leakage through the radial clearance. The piston is axially and radially guided in the body of the flared tube fitting to maintain alignment of the conically shaped sealing surfaces at assembly to the flared transmission line and nut member.

DETAILED DESCRIPTION OF THE PREFERRED EMBODIMENT

Figure 1:
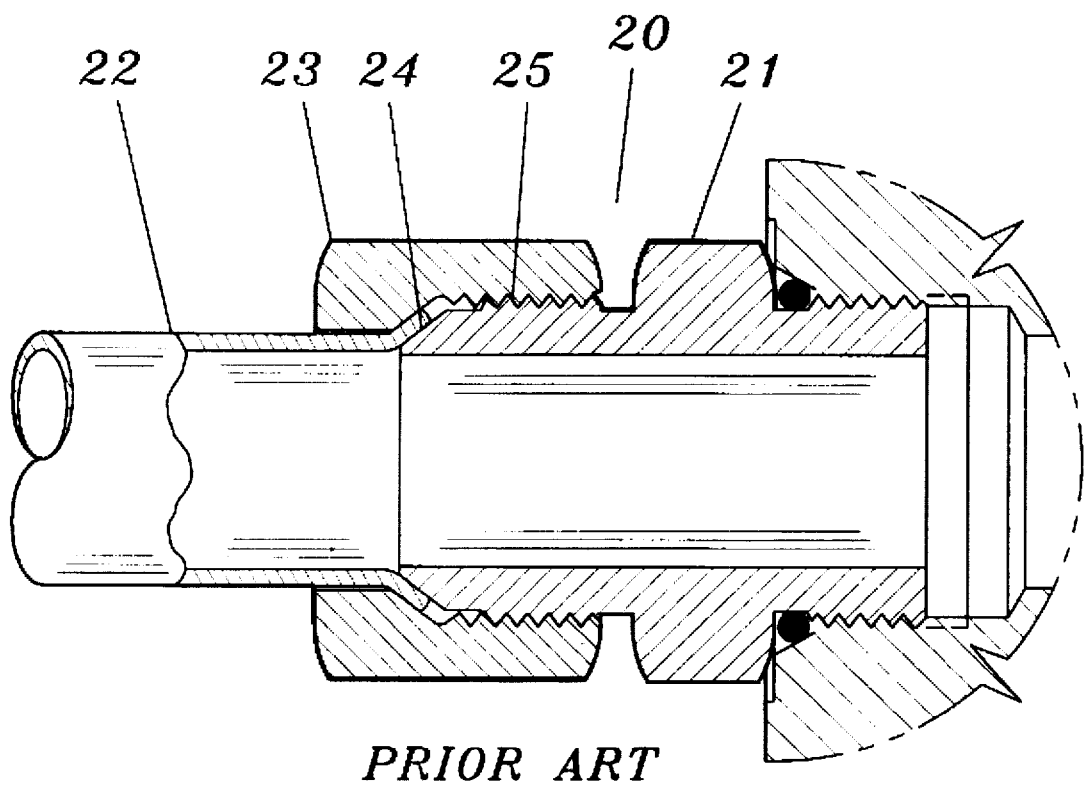
FIG. 1 is a sectional view of a flared tube fitting connection which is typical of the prior art.

FIG. 1 illustrates the prior art flared tube fitting connection 20 consisting of a flared tube connector 21 engaging the flared tube 22 which is supported by a nut member 23. The mechanical damping force on the flared joint 24 is applied by the axially preloaded thread engagement 25 of the nut member 23 and the flared tube connector 21.

Figure 2:
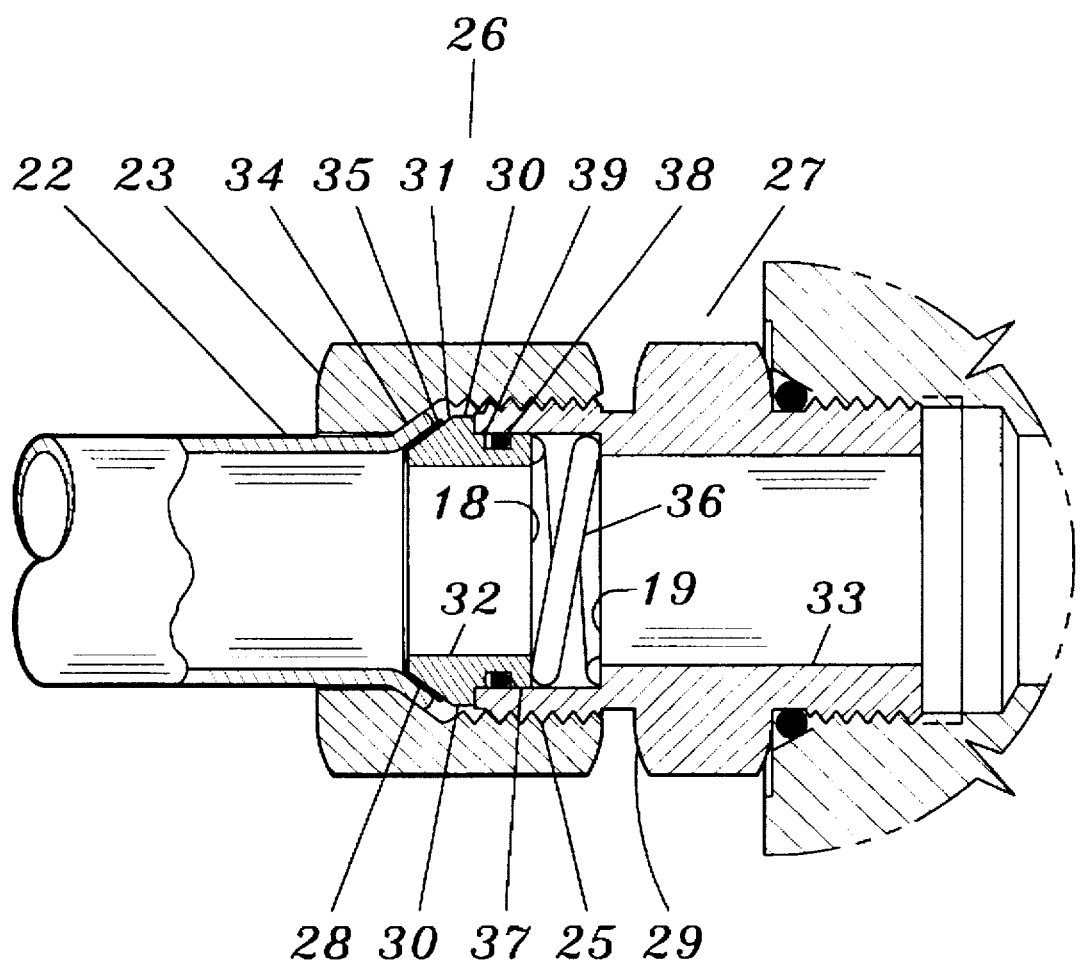
FIG. 2 is a sectional view of a flared tube connector fitting with the preferred embodiment of the invention.
Figure 3:
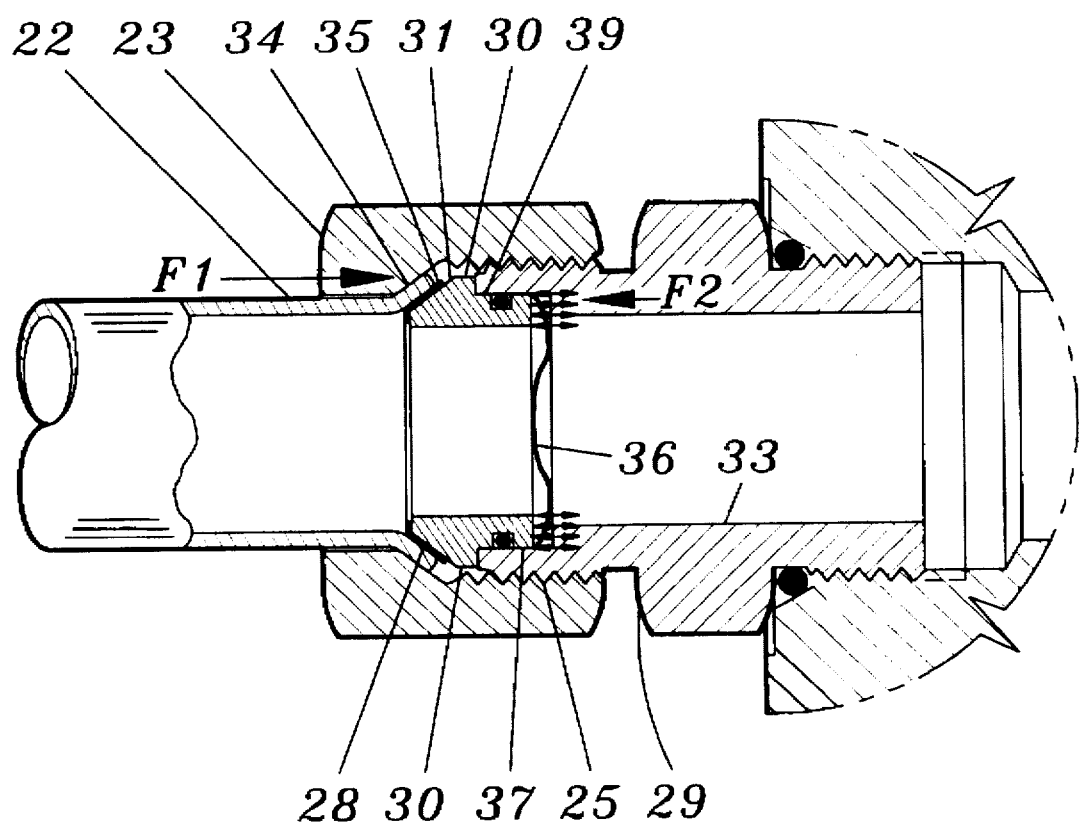
FIG. 3 is a sectional view of a flared tube connector fitting with the preferred embodiment of the invention and illustrating the hydrostatic pressure force distribution for maintaining the sealing contact on the flared tube connection.

FIG. 2 displays the preferred embodiment of the invention in a flared tube connection 26 consisting of the flared tube fitting 27 engaging the flared tube 22 which is supported by a nut member 23. The mechanical clamping force upon the flared connection 28 is applied by the axially preloaded thread engagement 25 of the nut member 23 and the flared tube fitting 27. The flared tube fitting 27 consists of a body 29 housing a piston 30 to engage its conically shaped end 31 with the flared tube 22. The body 29 is externally threaded at both ends. One end of body 29 has a recess 37 of a predetermined diameter and an annular body surface 18. The piston 30 contains an axial bore or flow passage 32 which communicates with an axially extending bore or flow passage 33 in the body 29. The flared end 34 of the tube 22 is clamped to the conically shaped end 31 of the piston 30 by a nut member 23. A malleable metal seat liner 35 is located between the flared end 34 of tube 22 and the conically shaped end 31 of the piston 30 to compensate for the surface irregularities at the flared connection 28. A spring means 36 in the form of a wave spring washer is located in the recess diameter 37 of the body 29 to force the conically shaped end 31 of the piston 30 to maintain a sealing contact on the flared connection 28. The force exerted by the spring means 36 is supplemented by the hydrostatic force of the axial pressure distribution on the piston 30 as shown in FIG. 3. A sealing means 38 is provided on the engaged rim diameter 39 of the piston 30 to prevent external leakage. The rim diameter or annular rim portion 39 of piston 30 terminates in an annular rim surface 19 which is axially spaced from the annular body surface 18. The sealing means 38 is in the form of a ring made from an elastomeric material. The sealing means 38 may take the form of sealing rings made of elastomeric and plastic materials.

FIG. 3 illustrates the principle forces that maintain the sealing contacts on the flared connection 28. The mechanical clamping force F1 on the flared connection 28 is applied by the axial preload on the thread engagement 25 of the nut member 23 and the body 29.

In the event the mechanical damping force F1 was removed, the force of spring means 36 on piston 30 would prevent separation of the conically shaped end 31, malleable metal liner 35 and the flared end 34. The hydrostatic pressure force F2, a product of the net exposed annular area of rim diameter 39 and the pressure in the flow passage 33, will apply the force F2 to maintain a sealed flared connection 28.

Figure 4:
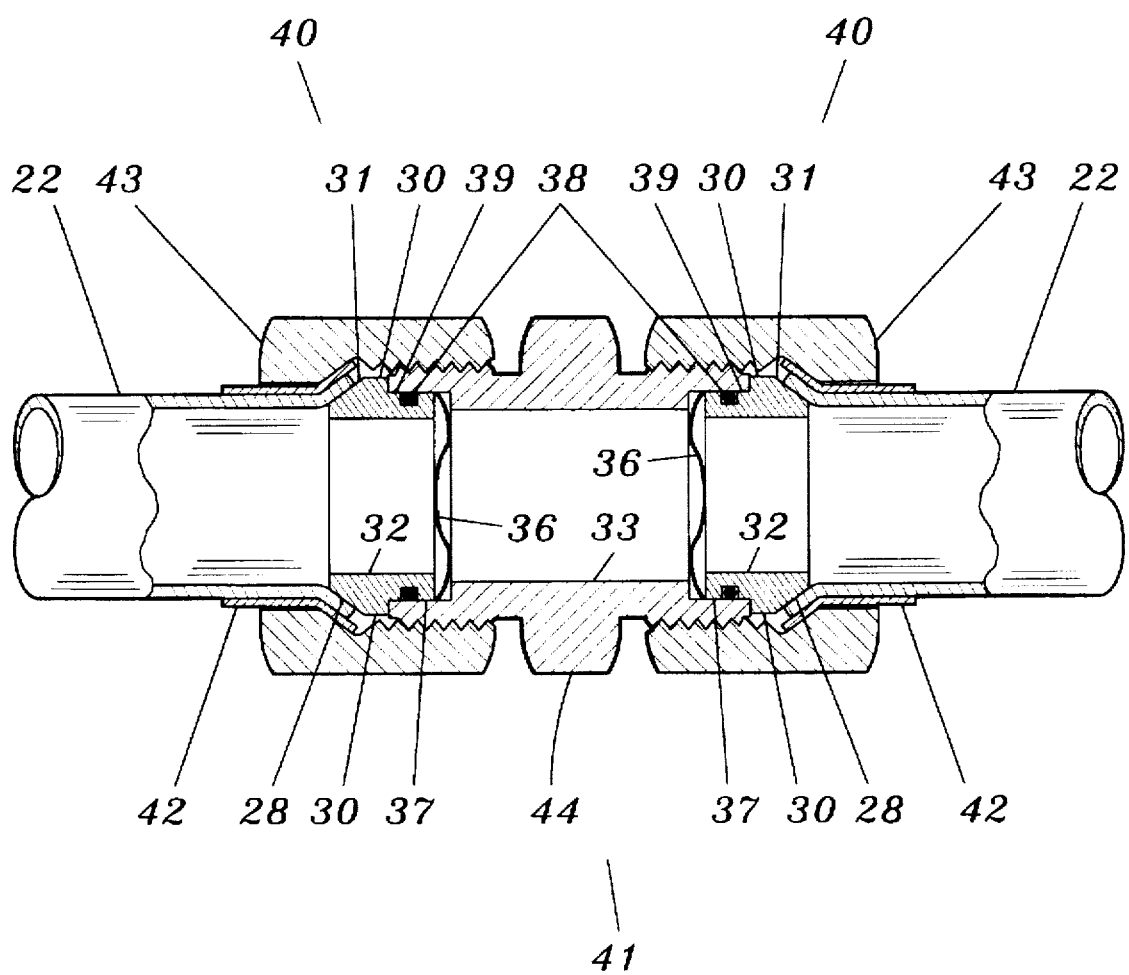
FIG. 4 is a sectional view of the flared tube union fitting with the preferred embodiment of the invention.

FIG. 4 illustrates the preferred embodiment of the invention in a flared tube union fitting connection 40 consisting of a flared tube union fitting 41 engaging two (2) flared tubes 22. Each flared tube 22 is supported by collar 42 located within the nut member 43.

The flared tube union fitting 41 consists of a body 44 housing two (2) pistons 30 to engage the respective conically shaped ends 31 with the flared tubes 22. Each piston 30 contains a flow passage 32 to communicate with the flow passage 33 in the body 44. Two (2) spring means in the form of helical coils 36 are located in the recess diameters 37 of the body 44 to prevent the conically shaped ends 31 of the pistons 30 from separating at the flared connections 28. The sealing force exerted by the helical coils 36' is supplemented by the hydrostatic pressure force F2 of the axial pressure distribution on the piston 30 as shown in FIG. 3. Sealing means 38 are provided on the engaged rim diameters 39 of the pistons 30 to prevent external leakage. The sealing means 38 are in the form of rings made from an elastomeric material.

Figure 5:
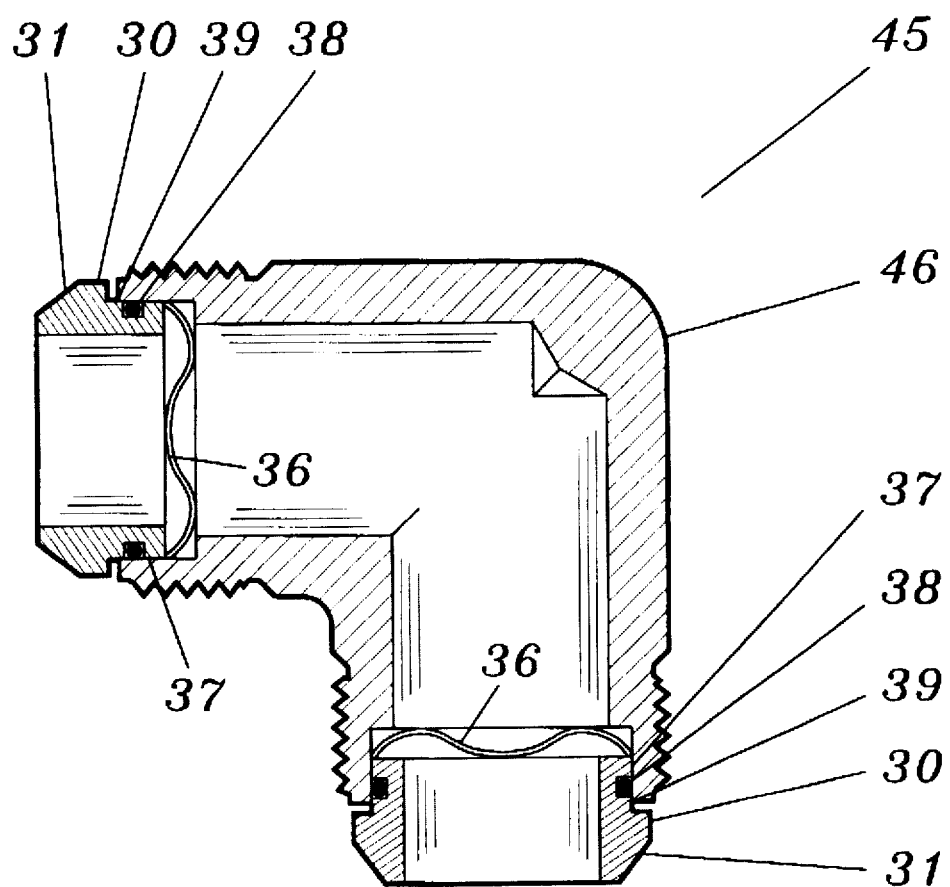
FIG. 5 is a sectional view of a flared tube union elbow fitting with the preferred embodiment of the invention.

FIG. 5 illustrates the preferred embodiment of the invention in a flared tube union elbow 45 consisting of a body 46 housing two pistons 30. A spring means 36 is located in the recess diameters 37 to prevent pistons 30 from losing contact with the conically shaped ends 31 on the engage tube flared connections 28. The spring means 36 is compressed by the assembly of nut members 23 and 43 as shown and described in the respective FIGS. 2 and 4. A sealing means 38 is provided on each engaged rim diameter 39 in the recess 37 of body 46 to prevent external leakage.

Figure 6:
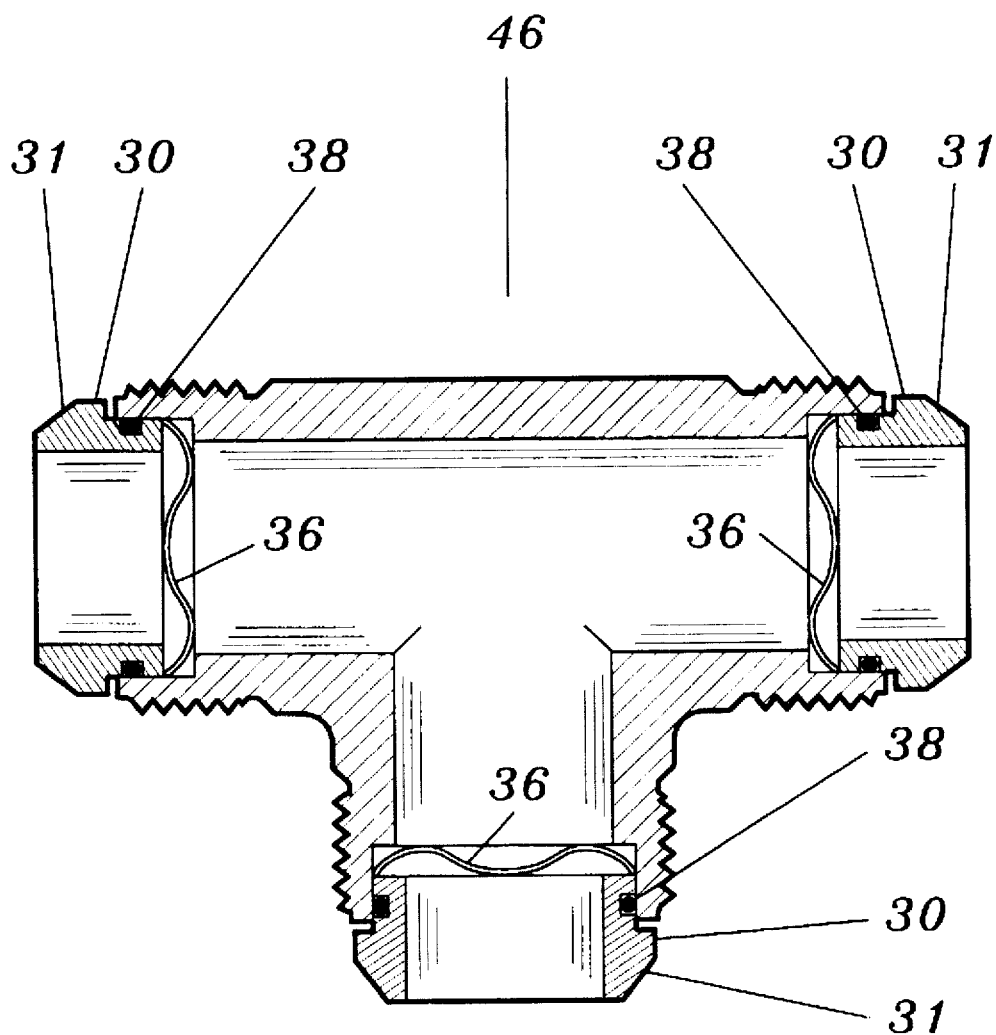
FIG. 6 is a sectional view of a flared tube union tee fitting with the preferred embodiment of the invention.
Figure 7:
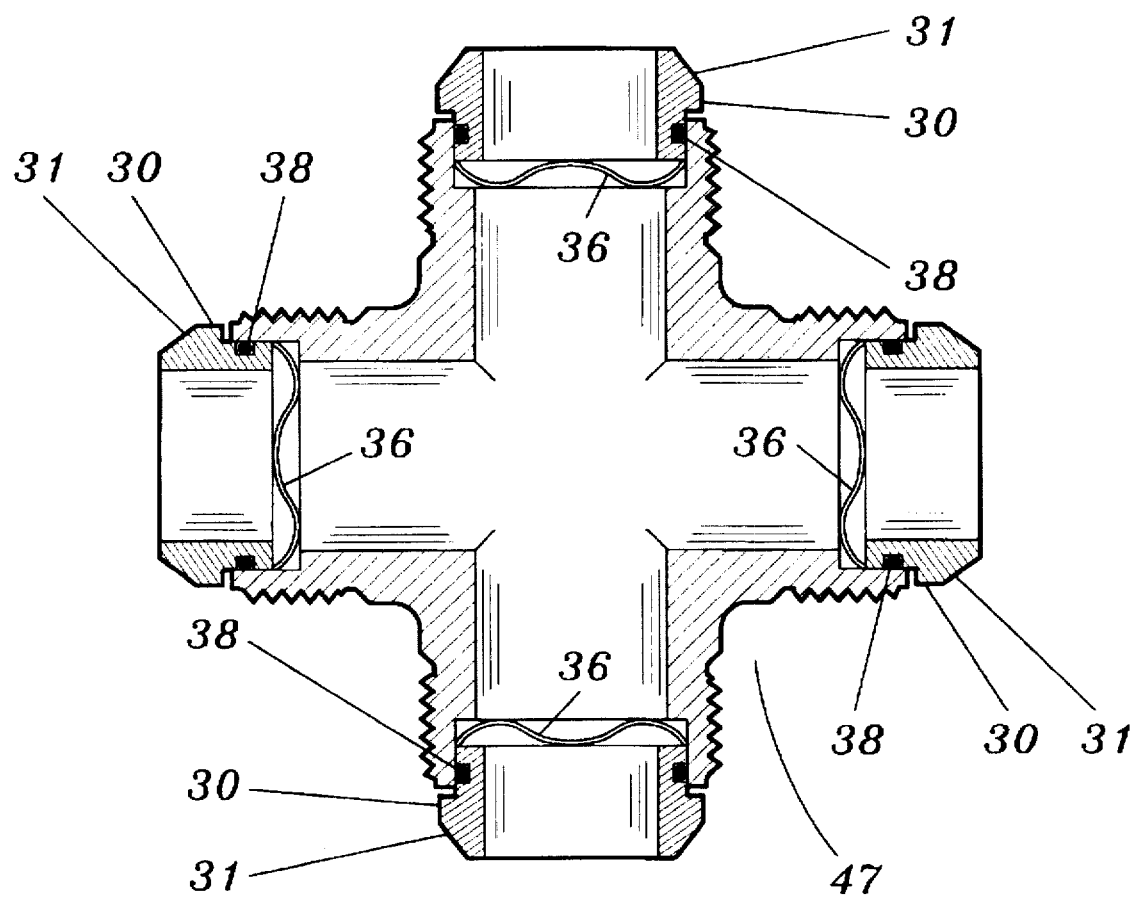
FIG. 7 is a sectional view of a flared tube cross fitting with the preferred embodiment of the invention.

FIGS. 6 and 7 illustrate the preferred embodiment of the invention in a flared tube union tee fitting 46 and a flared tube cross fitting 47. At each line connection the piston 30 is assembled as described by FIGS. 2 and 4.

The preferred embodiment of the invention was constructed with an SAE#16 flared tube union fitting and tested. The test results disclose that the axially mechanical preload of the assembled nut member on the flared tube connection could be removed and no noticeable seepage was encountered at internal fluid pressures up to 4000 psi.

The present invention of the hydrostatic pressure biased sealing feature can be applied to one or more line connections of the numerous flared tube fitting designs.

I claim:

1. A fluid flared tube fitting comprising:

a body having an axial bore, said body having an end which is externally threaded;

said bore being enlarged at one end to form a recess having an annular body surface;

a piston having an axial flow passage, said piston at one end having an annular rim portion terminating in an annular rim surface and at the other end a larger diameter conically shaped sealing surface portion, said rim and said conical sealing portions being spaced apart;

said recess having an axially extending dimension which is longer than the axially extending dimension of said annular rim portion;

said piston having said rim portion received in said recess of said body, said rim portion having a radial clearance with said body;

a shoulder between said annular rim portion and the larger diameter conically shaped sealing surface portion which is axially supported by the threaded end of said body;

a space located between said rim portion of said piston and said annular body surface;

spring means located in said space between said annular rim surface and said annular body surface; said spring means biasing said piston away from said annular body surface;

a circular groove located in said rim portion; and sealing means located in said circular groove for sealing said radial clearance;

the nominal diameter of said annular rim surface and said recess being sized to provide an annular area for exerting a hydrostatic pressure force on said piston.

2. The fluid flared tube fitting defined in claim 1 wherein said spring means is in the form of a wave spring washer.

3. The fluid flared tube fitting described in claim 1 wherein said spring means is in the form of a helical coil.

4. The fluid flared tube fitting described in claim 1 wherein said sealing means is in the form of a ring made from an elastomeric material.

5. The fluid flared tube fitting defined in claim 1 wherein said sealing means is a combination of sealing rings of elastomeric and plastic materials.

6. The fluid flared tube fitting defined in claim 1 which is in the form of a union elbow having one or more flared line connections, each connection having the same components including said piston, each piston being subject to the hydrostatic pressure force to maintain sealing contact therebetween.

7. The fluid flared tube fitting defined in claim 1 which is in the form of a union coupling having one or more flared line connections, each connection having the same components including said piston, each piston being subject to the hydrostatic pressure force to maintain sealing contact therebetween.

8. The fluid flared tube fitting defined in claim 1 which is in the form of a union tee fitting having one or more flared line connections, each connection having the same components including said piston, each piston being subject to the hydrostatic pressure force to maintain sealing contact therebetween.

9. The fluid flared tube fitting defined in claim 1 which is in the form of a union cross fitting having one or more flared line connections, each connection having the same components including said piston, each piston being subject to the hydrostatic pressure force to maintain sealing contact therebetween.

10. A fluid flared fitting assembly comprising:
   a body having an axial bore, said body having an end which is externally threaded;
   said bore being enlarged at one end to form a recess having an axial bore,
   a piston having an annular rim portion terminating in an annular rim surface and a larger diameter conically shaped sealing surface portion, said rim and said conical sealing portions being spaced apart;
   said piston having said rim portion received in said recess of said body; said rim portion having a radial clearance with said body;
   a shoulder between said annular rim portion and the larger diameter conically shaped sealing surface portion which is axially supported by the threaded end of said body;
   a space located between said rim portion of said piston and said annular body surface;
   spring means located in said space between said annular rim surface and said annular body surface; said spring means biasing said piston away from said annular body surface;
   a circular groove located in said rim portion;
   sealing means located in said circular groove for sealing said radial clearance;
   the nominal diameter of the said annular rim surface and said recess being sized to provide an annular area for exerting a hydrostatic pressure force on said piston;
   a nut member having a bore which has one end section internally threaded, a conical seat within the bore of said nut member and spaced from said internally threaded end section;
   a tube having a flared end assembled within said nut member, said flared end of said tube being axially located and supported by said conical seat in said nut member; and the flared end of the said tube abutting said conical sealing surface of said piston located in the recess of said body.

11. The fluid flared tube fitting assembly defined in claim 10, wherein the nut member possess a bore which is internally threaded at one end and at the other end a retaining wall with an axial hole for supporting and locating a collar, the said collar features a bore for axially locating a tube and a conically shaped seat for positioning and supporting the flared end of the said tube.

12. The fluid flared tube fitting assembly defined in claim 10, wherein a conically shaped seat liner of malleable material is located and compressed between said flared end of said tube and the said conically shaped sealing surface of the said piston.

13. The fluid flared tube fitting assembly defined in claim 10, wherein said spring means is in the form of a wave spring washer.

14. The fluid flared tube fitting assembly defined in claim 10, wherein said spring means is in the form of a helical coil.

15. The fluid flared tube fitting assembly defined in claim 10, wherein said sealing means is in the form of a ring made from an elastomeric material.

16. The fluid flared tube fitting assembly defined in claim 10, wherein said sealing means is a combination of sealing rings of elastomeric and plastic materials.

17. The fluid flared tube fitting assembly defined in claim 10 which is in the form of a union elbow having one or more flared line connections, each connection having the same components including said piston, each piston being subject to the hydrostatic pressure force to maintain sealing contact therebetween.

18. The fluid flared tube fitting assembly defined in claim 10 which is in the form of a union coupling having one or more flared line connections, each connection having the same components including said piston, each piston being subject to the hydrostatic pressure force to maintain sealing contact therebetween.

19. The fluid flared tube fitting assembly defined in claim 10 which is in the form of a union tee fitting having one or more flared line connections, each connection having the same components including said piston, each piston being subject to the hydrostatic pressure force to maintain sealing contact therebetween.

20. The fluid flared tube fitting assembly defined in claim 10 which is in the form of a union cross fitting having one or more flared line connections, each connection having the same components including said piston, each piston being subject of the hydrostatic pressure force to maintain sealing contact therebetween.

* * * * *